United States Patent [19]

Kloster

[11] 4,422,238
[45] Dec. 27, 1983

[54] SHOCK ABSORBER SHROUD CUTTING TOOL

[76] Inventor: Kenneth D. Kloster, 6649 Mill Ridge Rd., Maumee, Ohio 43537

[21] Appl. No.: 314,706

[22] Filed: Oct. 26, 1981

[51] Int. Cl.³ .......................... B23D 21/08; B26D 3/16
[52] U.S. Cl. .......................................... 30/101; 30/96; 30/91.2
[58] Field of Search ..................... 30/101, 102, 94, 95, 30/96, 91.2, 90.3, 90.8, 103, 104, 105; 82/4 C, 64; 409/175, 178, 179, 180

[56] References Cited

U.S. PATENT DOCUMENTS

| | | | |
|---|---|---|---|
| 760,128 | 5/1904 | Jackson | 30/101 |
| 1,020,795 | 3/1912 | Borden | 30/95 |
| 2,053,644 | 9/1936 | Tuttle | 409/175 X |
| 2,572,611 | 10/1951 | Glore et al. | 30/104 |
| 3,911,574 | 10/1975 | Jones | 30/105 |

*Primary Examiner*—Frederick R. Schmidt
*Assistant Examiner*—Debra S. Meislin
*Attorney, Agent, or Firm*—Wilson, Fraser, Barker & Clemens

[57] ABSTRACT

The present invention relates to a cutting tool which is utilized to sever a cylindrical body such as a cylindrical shroud of a factory-sealed vehicular suspension system of the type commonly referred to as a MacPherson strut suspension system. The tool is designed with a construction which permits the tool to sever the cylindrical shroud while the shroud remains attached to the vehicle. The tool comprises an upper control mechanism which is mechanically coupled to a lower cutting assembly by means of a pair of coaxial elongate tubes. The lower cutting assembly includes a plurality of circumferentially spaced, rotatable cutting wheels which are radially movable between a retracted position and an expanded position. The upper control mechanism determines the radial position of the cutting wheels by controlling the relative rotative position between the two elongate tubes. The upper control mechanism is used to rotate the cutting assembly about the upper end of the cylindrical shroud while simultaneously advancing the cutting wheels into engagement with the shroud. The upper control mechanism is provided with a release assembly which enables an operator to quickly move the cutting wheels between the retracted and expanded positions.

10 Claims, 15 Drawing Figures

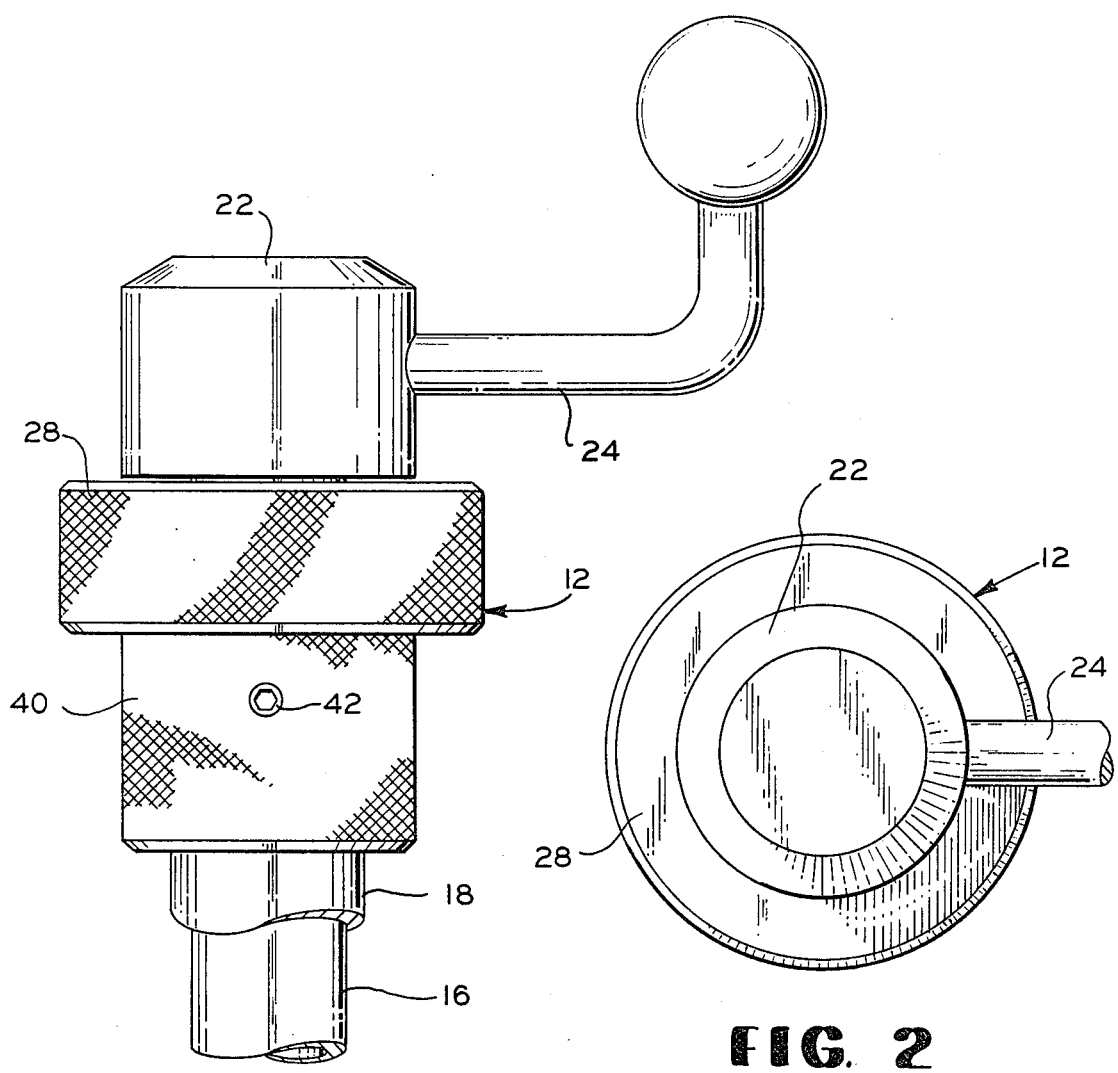
FIG. 2
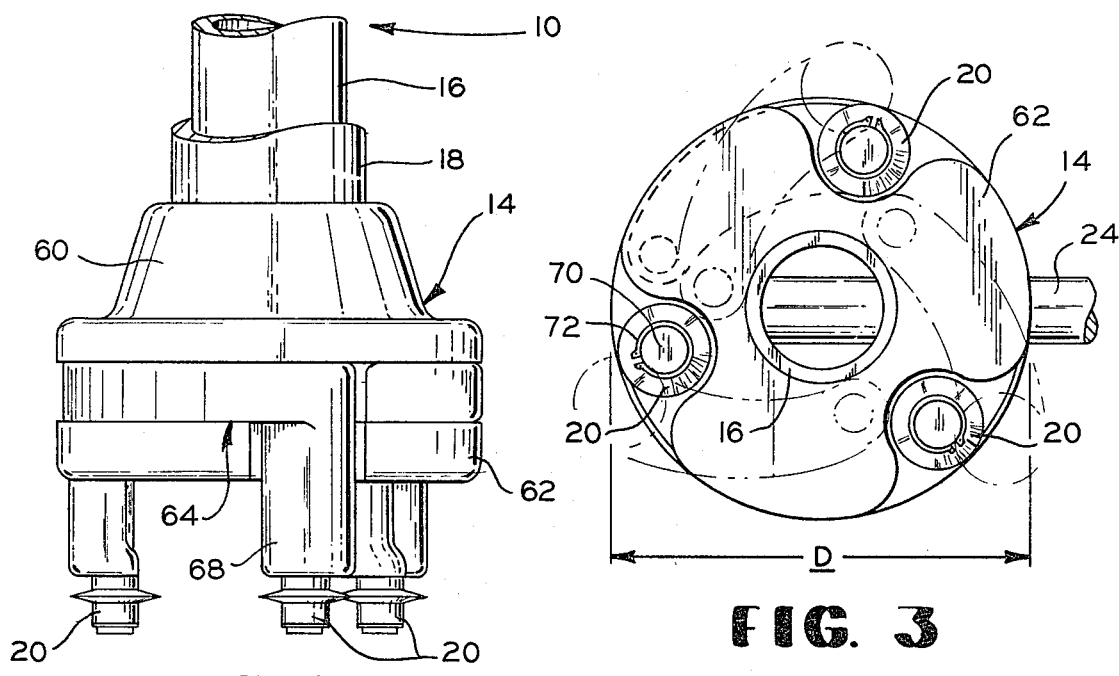
FIG. 3
FIG. 1

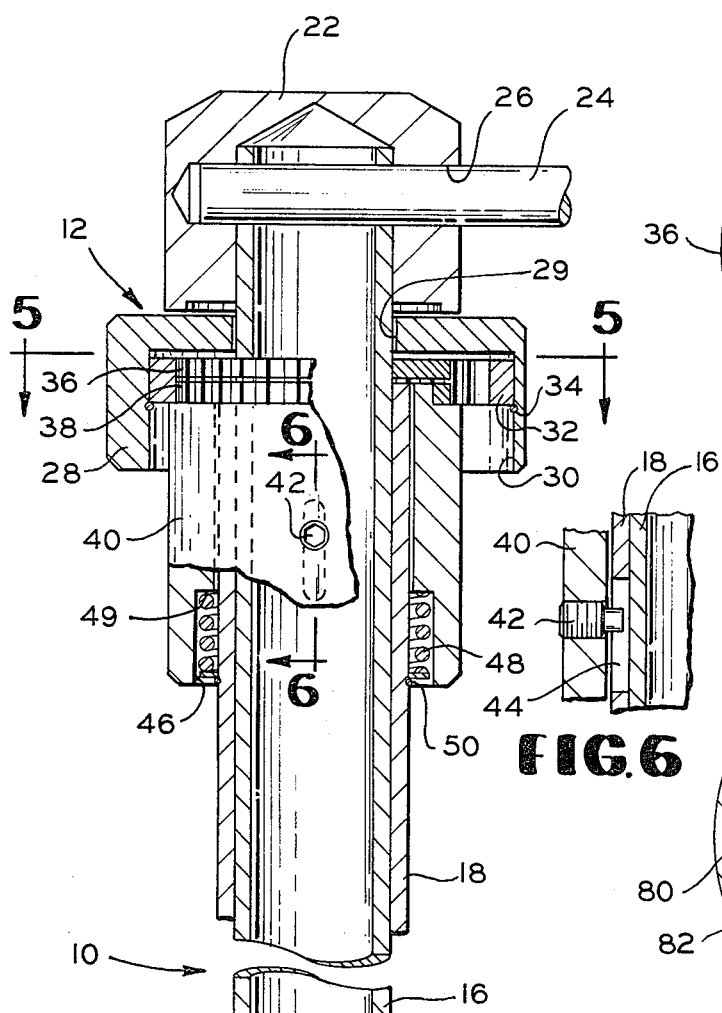
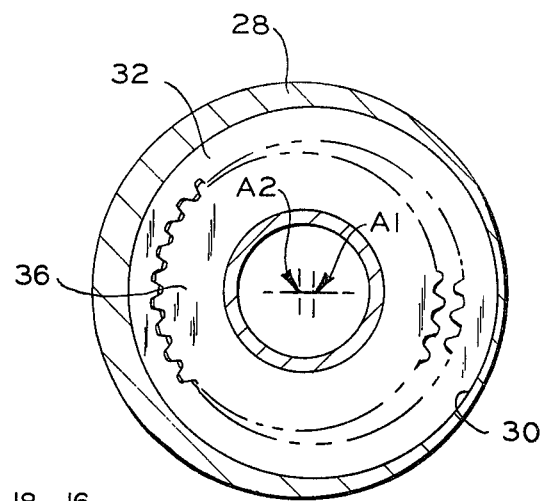
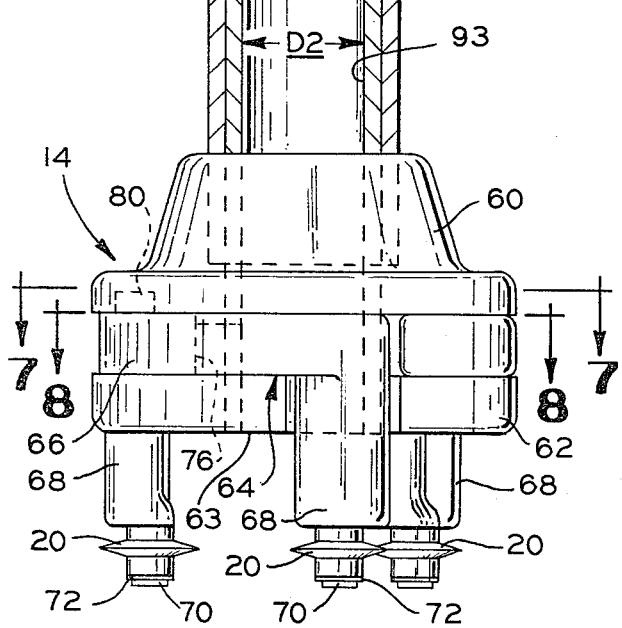
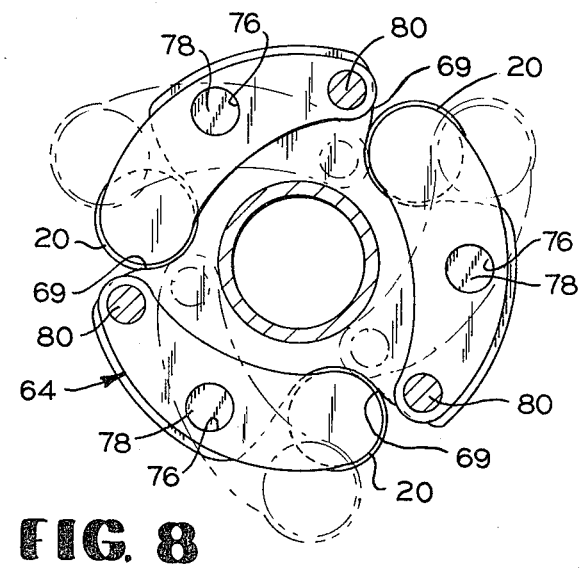
FIG. 4  FIG. 5  FIG. 6  FIG. 7  FIG. 8

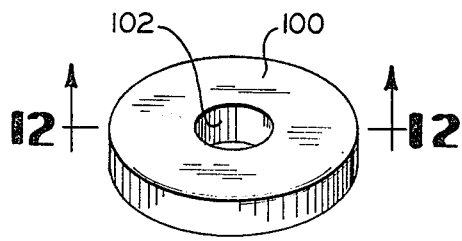
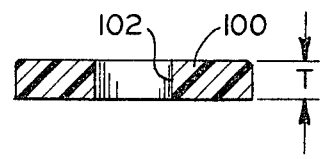
FIG. 11  FIG. 12
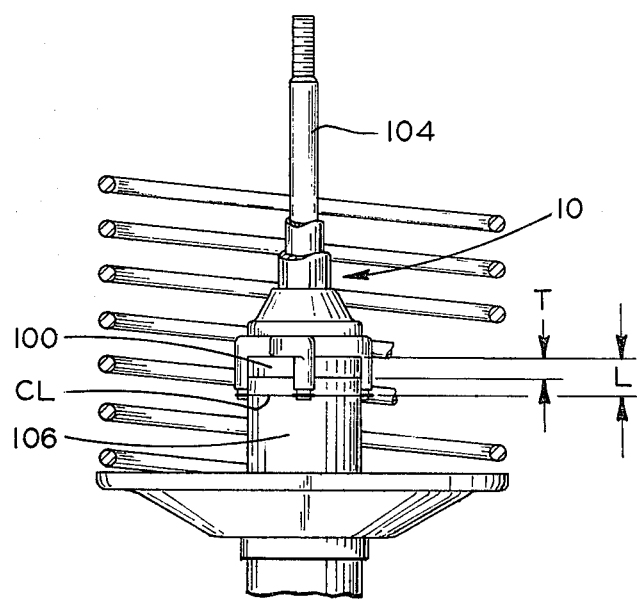
FIG. 13
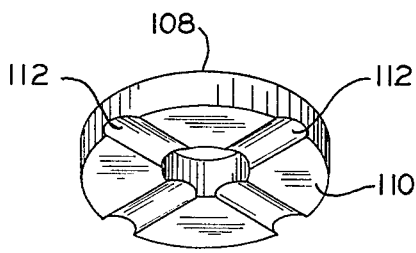
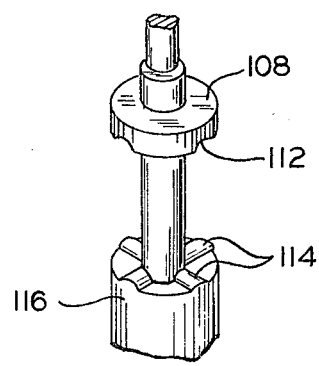
FIG. 14  FIG. 15

SHOCK ABSORBER SHROUD CUTTING TOOL

CROSS REFERENCE TO RELATED APPLICATION

This application is related in subject matter to my pending U.S. patent application Ser. No. 282,527 filed June 13, 1981 which is a continuation of Ser. No. 086,784 filed Oct. 22, 1979 now abandoned.

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact vehicle suspension system. The MacPherson strut suspension system is disclosed in more detail in U.S. Pat. No. 2,624,592 to E. S. MacPherson.

One of the problems associated with MacPherson strut assemblies is related to the replacement of a worn shock absorber unit. One solution to this problem is to manufacture the MacPherson strut assembly with a construction which permits the worn shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber unit is inserted into an associated cylindrical shroud which is subsequently sealed by welding or roll forming operations. The cylindrical shroud which houses the shock absorber typically includes a coil spring support and a lower support bracket. Thus, when the shock absorber unit wears out, the vehicle owner is faced with the expense of replacing the entire cylindrical shroud assembly, including the coil spring support and the lower support bracket.

SUMMARY OF THE INVENTION

The present invention relates to a tool for severing a cylindrical body. For example, the tool can be utilized to sever the upper end of a cylindrical shroud in a MacPherson strut suspension system. If the original shock absorber is factory-sealed within the cylindrical shroud, the upper end of the shroud must first be severed to provide access to the worn shock absorber unit. The present invention provides a tool for effectively and accurately severing the upper end of the cylindrical shroud. The worn shock absorber is then accessible and may be readily removed and replace with a new shock absorber.

In accordance with the present invention, the cutting tool is designed with a construction which permits the tool to sever the cylindrical shroud while the shock absorber assembly remains attached to the vehicle. The tool comprises an upper control mechanism which is mechanically coupled to a lower cutting assembly by means of a pair of coaxial elongate tubes. The lower cutting assembly includes a plurality of circumferentially spaced cutting wheels which are radially movable between a retracted, closed position and an expanded, open position.

In its retracted position, the cutting assembly is sufficiently small to enable the assembly to be inserted through an access hole typically provided in the upper portion of the inner vehicle fender panel. Once the cutting assembly has been inserted through the access hole, the cutting wheels can be expanded and positioned around the upper end of the cylindrical shroud. The upper control mechanism, which remains above the access hole, can then be utilized to rotate the cutting wheels about the shroud while simultaneously advancing the wheels into severing engagement with the shroud.

The upper control mechanism is provided with a release means for quickly moving the cutting wheels between the retracted and expanded positions. The release means enables the operator to quickly insert the retracted cutting assembly through the fender access hole and then position the expanded assembly on the upper end of the cylindrical shroud.

Accordingly, it is an object of the present invention to produce a tool capable of severing a cylindrical shroud of a factory-sealed MacPherson strut assembly to facilitate the replacement of the shock absorber unit.

It is another object of the present invention to effectively and accurately sever the upper end of a cylindrical shroud of a factory-sealed MacPherson strut assembly while the shroud remains attached to the vehicle.

Another object of the invention is to produce a tool for severing the cylindrical shroud of a MacPherson strut assembly which is readily manufactured and may be utilized by the automotive repair industry.

The above and other objects of the invention may be typically achieved by a tool for severing a cylindrical body comprising a support member having a rotational axis. Cutting means are mounted on the support member and are movable toward and away from the rotational axis of the support member. A control means is also mounted on the support member and is axially spaced from the cutting means along the rotational axis of the support member. The control means is coupled to the cutting means for selectively moving the cutting means toward and away from the rotational axis of the support member.

BRIEF DESCRIPTION OF THE DRAWINGS

The above, as well as other objects and advantages of the invention, will become readily apparent to one skilled in the art from reading the following detailed description of the invention when considered in light of the accompanying drawings, in which:

FIG. 1 is a side elevational view of a cutting tool embodying the features of the present invention;

FIG. 2 is a top plan view of the cutting tool shown in FIG. 1;

FIG. 3 is a bottom plan view of the cutting tool shown in FIG. 1;

FIG. 4 is a partial sectional, partial elevational view of the cutting tool shown in FIG. 1;

FIG. 5 is a sectional view taken along the line 5—5 of FIG. 4;

FIG. 6 is a sectional view taken along the line 6—6 of FIG. 4;

FIG. 7 is a sectional view taken along the line 7—7 of FIG. 4;

FIG. 8 is a sectional view taken along the line 8—8 of FIG. 4;

FIG. 11 is a perspective view of an adapter element utilized for determining the location of the cutting line on the associated cylindrical shroud of a MacPherson strut assembly;

FIG. 12 is a sectional view of the adapter element illustrated in FIG. 11 taken along line 12—12 thereof;

FIG. 13 is a fragmentary elevational view of the cutting tool illustrated in FIGS. 1 through 8 and the adapter of FIG. 11 shown in position of use on a MacPherson strut assembly;

FIG. 14 is a perspective view illustrating the bottom of an adapter element having an undersurface designed to conform to the upper surface of a cylindrical shroud of a MacPherson strut assembly; and FIG. 15 is a perspective view showing the adapter illustrated in FIG. 14 positioned on the upper portion of a cylindrical shroud of a MacPherson strut assembly.

DESCRIPTION OF THE PREFERRED EMBODIMENT

Figure 9:
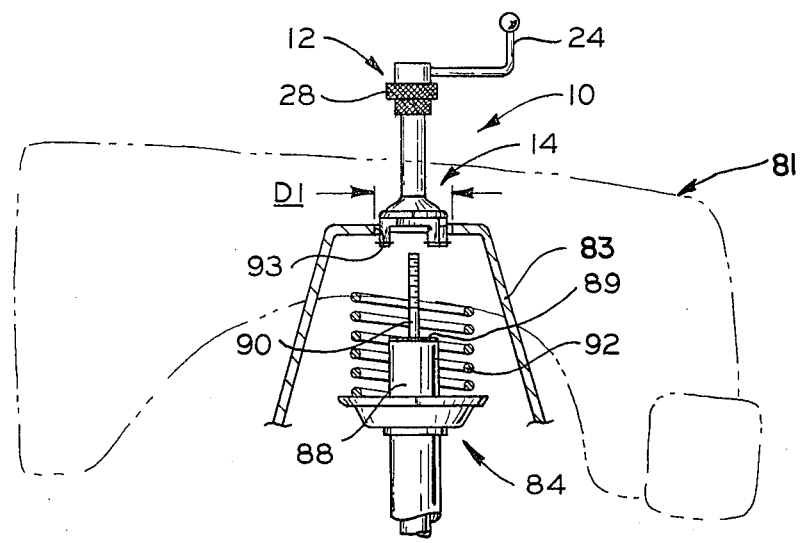
FIG. 9 is a side elevational view of the cutting tool as it is inserted through an access hole provided in a vehicle fender.

Referring to FIGS. 1 through 8, there is shown a cutting tool 10 embodying the features of the present invention. As will be discussed, the tool 10 is specifically designed to be utilized to sever the upper end of a cylindrical shroud in a factory-sealed MacPherson strut suspension system while the suspension system remains attached to the vehicle. After the cylindrical shroud is severed, the operator has access to the worn shock absorber such that the shock absorber can be readily removed and replaced with a new shock absorber cartridge.

The cutting tool 10 comprises an upper control mechanism 12 which is mechanically coupled to a lower cutting assembly 14 by means of a pair of coaxially positioned elongate tubes 16 and 18. The lower cutting assembly 14 includes a plurality of circumferentially spaced, radially movable cutting wheels 20. The upper control mechanism 12 is utilized both to revolve the cutting wheels about the longitudinal axis of the tool and to also control the radial position of the cutting wheels 20. As will be discussed, the upper control mechanism 12 determines the radial position of the cutting wheels 20 by controlling the relative rotative position between the inner tube 16 and the outer tube 18.

The cutting wheels 20 are movable from a retracted position, shown in FIG. 3, to an expanded position, as shown in phantom in FIG. 3. In the retracted position, the lower cutting assembly 14 has a diameter D which is sufficiently small to permit the assembly 14 to be inserted through an access hole provided in the top of the inner vehicle fender panel while, in the expanded position, the cutting assembly 14 can be placed over the upper end of the cylindrical shroud.

As shown in FIG. 4, the upper control mechanism 12 includes an upper cap 22 which is secured to the extreme upper end of the inner tube 16. A horizontally disposed handle portion 24 extends through a horizontal bore hole 26 formed in the cap 22 and through the upper end of the inner tube 16.

The upper control mechanism 12 also includes a gear housing 28 positioned below the cap 22. The top wall of the gear housing 28 has a cylindrical aperture 29 formed therethrough with a diameter slightly greater than the diameter of the inner tube 16 to permit rotational movement of the gear housing 28 about the tube 16. As shown in FIGS. 4 and 5, the gear housing 28 has an enlarged cylindrical opening 30 with an axis A1 which is slightly offset from the common longitudinal axis A2 of the tubes 16 and 18. An internally toothed ring gear 32 is mounted within the cylindrical opening 30 of the housing 28. The ring gear 32 is formed with an external diameter slight less than the diameter of the cylindrical opening 30 to permit rotational movement of the gear 32 relative to the housing 28. The ring gear 32 is maintained within the opening 30 by means of a snap ring 34.

The internally toothed ring gear 32 engages externally toothed upper and lower ring gears 36 and 38 respectively. The upper gear 36 is provided with a first predetermined number of external teeth and is securely attached to the inner tube 16. The lower gear 38 is provided with a second predetermined number of external teeth which is less than the first predetermined number of teeth on the upper gear 36.

The lower ring gear 38 is securely attached to the upper end of a release sleeve 40 which encompasses the upper end of the outer tube 18. As shown in FIG. 6, the release sleeve 40 is mounted for limited axial movement relative to the outer tube 18 by means of a threaded pin 42 which is threaded into the side wall of the housing 40 and extends radially inwardly into an elongate slot 44 formed in the outer tube 18. The release sleeve 40 includes an enlarged lower cylindrical opening 46 for receiving a helical spring 48 having an upper end which engages an inner annular shoulder 49 formed in the release sleeve 40 and a lower end which engages a snap ring 50 mounted on the outer tube 18. The spring 48 functions to bias the release sleeve upwardly relative to the outer tube 18 such that the ring gear 38 is normally maintained in engagement with the ring gear 32.

The upper control mechanism 12 is utilized both to revolve the cutting wheels 20 about the longitudinal axis of the tool and to also control the radial position of the cutting wheels. As the handle 24 and the inner tube 16 are rotated relative to the gear housing 28, the rotation of the inner tube 16 is transmitted by the upper gear 36 through the ring gear 32 and to the lower gear 38 mounted on the release sleeve 40. The rotation of the sleeve 40 is then transmitted to the outer tube 18 by means of the pin 42. However, since the lower gear 38 is provided with less teeth than the upper gear 36, one complete revolution of the inner tube 16 will result in slightly less than one complete revolution of the outer tube 18. This results in relative rotation between the inner tube 16 and the outer tube 18 as both of the tubes are rotated about the longitudinal axis of the tool. As will be discussed, the relative rotation between the tubes 16 and 18 in one direction causes the lower cutting assembly to advance the cutting wheels 20 toward the longitudinal axis of the tool. Thus, rotation of the handle 24 relative to the gear housing 28 causes cutting wheels 20 to revolve about the longitudinal axis of the tool while simultaneously advancing the cutting wheels toward the longitudinal axis.

The lower cutting assembly 14 includes a camming disc 60 which is securely attached to the lower end of the outer tube 18. The inner tube 16 extends downwardly past the lower end of the outer tube 18 and is securely attached to a lower plate 62 having a lower shroud engaging surface 63. Each of the cutting wheels 20 is mounted on a support segment 64 having an upper plate portion 66 sandwiched between the camming disc 60 and the lower plate 62 and a downwardly extending arm portion 68 which is received within a respective one of a plurality of circumferentially spaced slots 69 formed in the lower plate 62. Each cutting wheel 20 is rotatably mounted on a vertical shaft 70 secured to the extreme lower end of each of the arm portions 68. The cutting wheels are maintained on the shafts 70 by means of snap rings 72.

The upper plate portion of each of the support segments 64 is provided with an aperture 76 which receives a respective one of a plurality of upstanding pivot pins 78 secured to the upper face of the lower plate 62. The pivot pins 78 define the pivot point for the segments 64. Each of the support segments 64 includes an upstanding camming pin 80 which is received within a respective one of a plurality of camming slots 82 formed in the lower end of the camming disc 60. As the inner tube 16 and the outer tube 18 are rotated relative to one another in one direction, the engagement of the camming pins 80 with the camming slots 82 causes the segments 64 to pivot about the pivot pin 78 and move the cutting wheels 20 radially outwardly. As the inner tube and outer tube are rotated relative to one another in the opposite directions, the cutting wheels 20 will be urged radially inwardly. Consequently, the upper control mechanism 12 can determine the radial position of the cutting wheels 20 by controlling the relative rotative position between the tubes 16 and 18.

As previously mentioned, the cutting tool according to the present invention is especially advantageous in instances in which it is desired to sever the upper end of the cylindrical shroud of a MacPherson strut shock absorber assembly while the shroud remains attached to the vehicle. However, before the tool can be utilized to sever the shroud, a helical coil spring which comprises a portion of the strut assembly must first be compressed on the vehicle to permit the upper end of the strut assembly to be disconnected from the inner fender panel. A tool which can be utilized to compress the coil spring while the cylindrical shroud remains attached to the vehicle is disclosed in U.S. Pat. No. 4,034,960 to K. D. Kloster.

There is shown in FIG. 9 a schematic representation of a vehicle fender 81 (shown in phantom) along with the portion of a wheel well housing 83 to which the upper end of a MacPherson strut assembly 84 was attached. The strut assembly 84 shown in FIG. 9 is partially disassembled and includes a cylindrical shroud 88 having a shock absorber piston rod 90 extending from the welded upper end 89. The strut assembly 84 also includes a lower spring support 91 attached to the shroud 88 for supporting a helical coil spring 92.

After the associated coil spring 92 has been compressed, the upper strut mount (not shown) and the upper spring retaining platform (not shown) can be removed to open an access hole 93 provided in the upper end of the wheel well housing 83. The lower cutting assembly 14 of the tool 10 is then set in the retracted position and inserted through the access hole 93. As previously mentioned, the tool 10 is constructed with a cutting assembly 14 have a diameter D which is less that the diameter D1 of the access hole 93.

Figure 10:
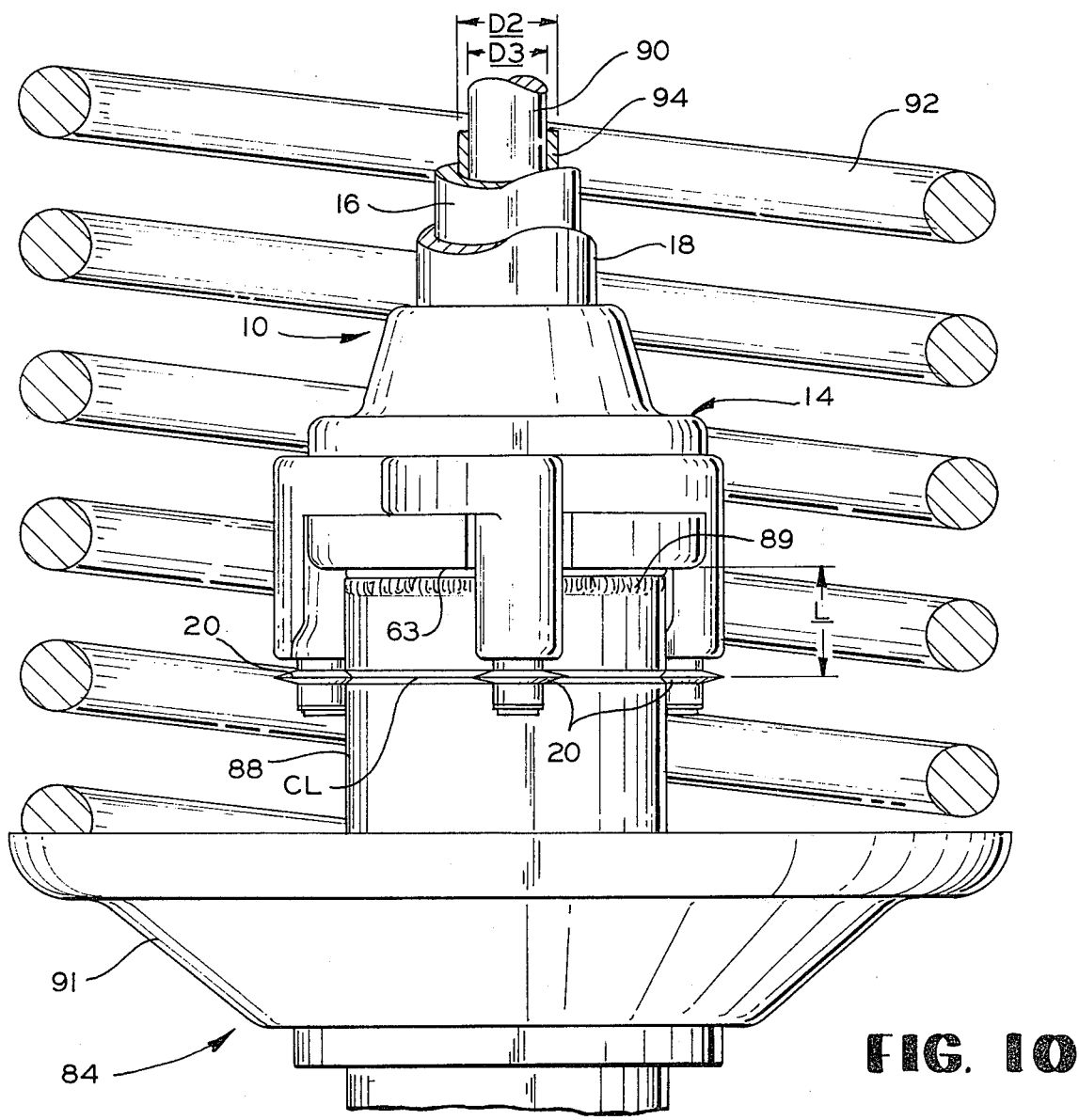
FIG. 10 is a side elevational view of the lower portion of the cutting tool in position to sever the upper end of a cylindrical shroud of a MacPherson strut suspension assembly.

Once the lower cutting assembly 14 has been inserted through the access hole 93, the operator can set the cutting assembly 14 in the expanded position and then place the assembly over the upper end of the cylindrical shroud 88, as shown in FIG. 10. It should be noted that the operator can quickly move the cutting wheels 20 between the retracted and expanded positions by utilizing the release sleeve 40. By momentarily moving the release sleeve 40 downwardly so as to disengage the lower gear 38 from the ring gear 32, the inner tube 16 and the outer tube 18 can be rotated relative to one another to quickly retract or expand the cutting wheels 20. The operator can then release the sleeve 40 and the lower gear 38 will be urged back into engagement with the ring gear 32 by means of the helical spring 48.

After the lower cutting assembly has been positioned on the cylindrical shroud 88 as shown in FIG. 10, the operator grasps the gear housing 28 with one hand while he rotates the handle 24 with the other hand. As previously mentioned, rotating the handle 24 relative to the gear housing 28 in one direction causes the cutting wheels 20 to revolve about the shroud 88 while simultaneously advancing the cutting wheels into severing engagement with the cylindrical shroud. It should be noted that, by permitting the gear housing 28 to slip in his hand while he rotates the handle, the operator can decrease the advance rate of the cutting wheels.

In FIG. 10, the inner tube 16 is shown with an inner diameter D2 which is greater than the outside diameter D3 of the piston rod 90. In these instances, an elongate tubular bushing 94 can be placed over the piston rod 90 in order to centrally stabilize the tool 10 and properly position the cutting wheels 20 about the shroud 88. The bushing 94 is constructed with an outer diameter slightly less than D2 and an inner diameter slightly greater than D3. In instances in which the diameter D3 approaches the diameter D2, it may be unnecessary to utilize the bushing 94.

After the severing operation has been completed, the tool 10 can be withdrawn through the access hole 93 and the upper end of the shroud 88 can be removed. At this time, the worn shock absorber is accessible and can be removed from the shroud and replaced with a new shock absorber. The new shock absorber can be held within the shroud 88 by utilizing a device such as a self-threading nut as disclosed in U.S. Pat. No. 4,256,421 to K. D. Kloster or a pinch-bolt sleeve as disclosed in U.S. Pat. No. 4,280,602 to K. D. Kloster.

As shown in FIG. 10, the cutting tool 10 is constructed so as to sever the cylindrical shroud 88 along a cutting line CL which is a distance L below the top of the shroud. In certain instances, it may be desirous to control the location of the cutting line CL. One approach to this problem is to provide an adjustment mechanism (not shown) attached to each support segment 64 for adjusting the vertical positions of the cutting wheels 20 relative to the lower shroud engaging surface 63.

A simple solution to the above mentioned problem is illustrated in FIGS. 11 through 13. A generally disc-shaped adapter element 100 is illustrated which can be employed to control the location of the cutting line CL. The adapter element 100 is typically constructed of a plastic material and includes a centrally disposed aperture 102. When utilized with an adapter element 100 as shown in FIGS. 11 and 12, the cutting tool 10 is constructed with a dimension L which is at least as large as the maximum cutting distance required for any given application. The tool is then utilized with the adapter element 100 having a thickness T and which has been designed for a given application.

In operation, as shown in FIG. 13, the adapter 100 is positioned such that the piston rod 104 extends through the central aperture 102 and is placed to rest on the top of the shroud 106. The cutting tool 10 is then placed on the adapter 100. The cutting line CL will then be located at a distance (L−T) below the top of the shroud 106.

The adapter 100 illustrated in FIGS. 11, 12, and 13 has relatively flat upper and lower surfaces. This type of construction is satisfactory when the operator desires to adjust the cutting line on a shroud have relatively flat upper end surface. However, in some instances, the upper surface of the shroud may be formed with ribs or other non-flat surface configurations on the upper end. Thus, if the cutting tool were placed directly on top of the shroud, the upper surface would prevent the tool from rotating evenly to provide an even cutting line. Under these conditions, it is desirous to form the undersurface of the adapter with a configuration which generally conforms to the surface on the top of the cylinder. For example, FIGS. 14 and 15 show an adapter 108 having an undersurface 110 formed with inwardly extending groove portions 112 to receive outwardly extending ribs 114 formed on top of a shroud 116. Thus, the adapter 108 not only provides the operator with a means of controlling the location of the cutting line, but it also provides a flat, stable surface upon which the tool may rotate.

In accordance with the provisions of the patent statutes, the principle and mode of operation of the invention have been explained in what is considered to represent its best embodiment. It should, however, be understood that the invention may be practiced otherwise than as specifically illustrated and described without departing from its spirit or scope in accordance with the attached claims.

What is claimed is:

1. A tool for severing a cylindrical body comprising:
   an elongate support member having a longitudinal axis;
   cutting means mounted on one end of said support member and having at least one cutting element adapted to engage the outer wall of the cylindrical body, said cutting element being movable toward and away from the longitudinal axis of said support member, said cutting means including a lower support surface defining a cylindrical body engaging portion for supporting said cutting means on one end of the cylindrical body, said cutting element being positioned a predetermined distance below the lower support surface for severing the cylindrical body a predetermined distance from the one end of the body; and
   control means mounted on the opposite end of said support member and coupled to said cutting means for selectively moving said cutting element toward and away from the longitudinal axis of said support member, said control means including means for revolving said cutting element about the longitudinal axis of said support member while simultaneously moving said cutting element toward the longitudinal axis whereby said cutting element is moved into engagement with the outer wall of the cylindrical body.

2. The tool defined in claim 1 wherein said tool includes centering means for aligning the longitudinal axis of said support member with the longitudinal axis of the cylindrical body, said centering means including a piston rod receiving aperture formed in the one end of said support member in alignment with the longitudinal axis thereof, said aperture adapted to receive a piston rod extending axially from one end of the cylindrical body.

3. The tool defined in claim 1 wherein said support means includes an inner tube and a coaxially positioned outer tube, said tubes having their one ends connected to said cutting means and their opposite ends connected to said control means.

4. The tool defined in claim 3 wherein said control means includes means for adjusting the relative rotative position between said tubes and wherein said cutting means is responsive to the rotative position for determining the location of said cutting element relative to the longitudinal axis of said support member.

5. The tool defined in claim 4 wherein said control means includes means connected to said opposite end of said inner tube for rotating said inner tube, a first externally toothed ring gear coaxially secured about said inner tube, a gear housing coaxially and rotatably mounted relative to said inner tube, an internally toothed ring gear rotatably mounted within said gear housing and engageable with said first ring gear, a second externally toothed ring gear coaxially positioned about said outer tube and engageable with said internally toothed ring gear, means for preventing relative rotation between said second ring gear and said outer tube, one of said first and second ring gears provided with a first predetermined number of external teeth, and the other one of said first and second ring gears provided with a second predetermined number of external teeth which is less than said first predetermined number, whereby rotation of said inner tube relative to said gear housing causes rotation of said inner tube and said outer tube about the longitudinal axis of said tubes while simultaneously producing relative rotation between said inner tube and said outer tube.

6. The tool defined in claim 5 wherein said control means includes a release sleeve coaxially positioned about said outer tube and mounted for limited axially movement relative to said gear housing, said second ring gear coaxially secured about said sleeve, and spring means for biasing said second ring gear axially in one direction into engagement with said internally toothed ring gear, said release sleeve being movable axially in an opposite direction to move said second ring gear out of engagement with said internally toothed ring gear whereby rotation of said release sleeve relative to said inner tube produces relative rotation between said inner and outer tubes.

7. The tool defined in claim 4 wherein said cutting means includes a lower plate attached to said one end of said inner tube, at least one support segment pivotally mounted on said lower plate, said support segment having said cutting element attached to one end thereof, said cutting element being movable toward the longitudinal axis of said tubes when said support segment is pivoted in one direction and being movable away from the longitudinal axis when said support segment is pivoted in an opposite direction, and a camming means attached to the one end of said outer tube and coupled to said support segment to effect pivotal movement of said support segment when said inner and outer tubes are rotated relative to one another.

8. The tool defined in claim 1 including an adapter element having a piston rod receiving aperture formed therein and having a predetermined thickness, said adapter element having an upper surface engageable with the lower support surface of said cutting means and having a lower surface defining a shroud engaging portion.

9. The tool according to claim 1 wherein said control means moves said cutting element toward the longitudinal axis a predetermined amount for each revolution of said cutting element.

10. A tool for severing a cylindrical body comprising:
an elongate support member having a longitudinal axis;
cutting means mounted on one end of said support member and having at least one cutting element adapted to engage the outer wall of the cylindrical body, said cutting element being mounted on one end of a support segment pivotally mounted on the one end of said support member, said segment coupled to said control means whereby pivotal movement of said segment results in said cutting element being moved toward and away from the longitudinal axis of the support member; and
control means mounted on the opposite end of said support member and coupled to said cutting means for selectively moving said cutting element toward and away from the longitudinal axis of said support member, said control means including means for revolving said cutting element about the longitudinal axis of said support member while simultaneously moving said cutting element toward the longitudinal axis whereby said cutting element is moved into engagement with the outer wall of the cylindrical body.

* * * * *